United States Patent [19]
Stoltz et al.

[11] Patent Number: 5,017,930
[45] Date of Patent: May 21, 1991

[54] PRECISION LANDING SYSTEM

[75] Inventors: John R. Stoltz, 5680 Oregon Rd., Mount Hood, Oreg. 97041; Carl W. Clawson, Hood River, Oreg.

[73] Assignee: John R. Stoltz, Hood River, Oreg.

[21] Appl. No.: 470,643

[22] Filed: Jan. 25, 1990

[51] Int. Cl.$^5$ ............................................. G01S 3/02
[52] U.S. Cl. .................................... 342/465; 342/410
[58] Field of Search ............... 342/410, 411, 412, 413, 342/463, 465, 33, 47; 364/451

[56] References Cited

U.S. PATENT DOCUMENTS

3,564,543 9/1968 Nehama et al.
3,665,464 5/1972 Mellander.
4,126,859 11/1978 Bohm.

Primary Examiner—Theodore M. Blum
Attorney, Agent, or Firm—Chernoff, Vilhauer, McClung & Stenzel

[57] ABSTRACT

A precision aircraft landing system comprising at least four receivers which are located at different predetermined positions. Each receiver includes a precision timer for measuring the timer interval between the receiver's detection of an interrogation signal and a reply signal from a transponder onboard the aircraft. The system also includes a central processing unit (computer) at a base station which collects the time measurements from the receivers, and calculates the location of the aircraft. Because more than three independent measurements are used, the base station can compute not only the three-dimensional coordinates of the aircraft, but also the transponder reply time. Preferably estimation filtering calculations, such as Kalman filtering, are used to improve the accuracy. The aircraft's position is compared with a mathematical description of a desired approach path, and the position error is then communicated to the aircraft. Any desired approach path than can be mathematically represented may be used in the system, including paths having curves, steps and segments.

16 Claims, 2 Drawing Sheets

PRECISION LANDING SYSTEM

BACKGROUND OF THE INVENTION

The present invention relates to the field of precision aircraft landing systems. More specifically, it pertains to a landing system which calculates an aircraft's position using distance ranging calculations which are based on signals from a transponder onboard the aircraft.

Various precision aircraft landing systems have been described in the literature. Some, such as the currently used Instrument Landing System (ILS), define a conical or pyramidal shaped approach volume having its apex at the end of the runway. For these systems, the aircraft maintains a proper approach path by remaining centered within the volume along its axis. (By way of example, ILS uses a "localizer" to provide left-right guidance, a "glide-slope" to provide up-down guidance, and "marker beacons" to indicate distance from the runway.) Such landing systems virtually mandate a straight approach path, prohibiting their use at airports having natural obstacles which require a curved, stepped, or segmented approach path. Additionally, due to the complexity and associated expense of the antennas required by such landing systems, typically only a single approach path is defined per runway, preventing the use of different glide paths which is preferred when different classes of aircraft are using the runway.

Another class of precision landing system determines the aircraft's position, compares it to a desired approach path, and transmits any required correction to the aircraft. Nehama U.S. Pat. No. 3,564,543 describes such a system, as well as other systems which use symmetry and simplified mathematics to define a pyramidal approach path.

In general, the position determining system disclosed in Nehama responds to time required for radio signals to travel between the landing aircraft and three known locations on the ground to determine three respective distances. From these three distances, the aircraft's position is calculated. More specifically, the Nehama position determining systems use an interrogator and three receivers. During operation, the interrogator transmits an interrogation signal to a transponder onboard the aircraft. The transponder, in response to the interrogation signal, transmits a reply signal which is detected by the three receivers. Each receiver measures the time interval between its detection of the interrogation signal and its detection of the reply signal. From these three time intervals, the respective distances between the aircraft and the three receivers are calculated.

A small time interval, on the order of a few microseconds, transpires between the transponder's reception of the interrogation signal and its subsequent transmission of the reply signal. Unaccounted for, this interval, or "transponder reply time", can cause errors of approximately 100 meters in the calculated position of the aircraft. The Nehama patent acknowledges the existence of the transponder reply time, but does not teach a method of eliminating this factor from the measured time intervals. Instead, Nehama arranges the transmitter and receivers in a substantially vertical geometric plane transverse to the length of the runway. This arrangement projects the error in a horizontal direction along the axis of the runway, a direction considered acceptable by the Nehama patent. As a side effect, this arrangement requires the use of elevated antenna towers in the vicinity of the airport, for if all the receivers were positioned at ground level, and thus in a horizontal plane, the calculated altitude of the aircraft would contain substantial errors, which would be an impermissible situation for a precision landing system.

Meilander U.S. Pat. No. 3,665,464 discloses a system for locating aircraft. As with the Nehama system, it times intervals between detection of interrogation and transponder reply signals. Meilander also acknowledges the transponder reply time, and accounts for it by subtracting its specified value from the measured time intervals. However, even a specification on the transponder reply time will allow for measurable amounts of "jitter", that is, variance from the mean, in the transponder reply time. This, again, results in considerable imprecision in the determination of the landing aircraft's position.

What is needed, therefore, is a precision aircraft landing system which determines on a real-time basis the location of an aircraft by measuring time intervals between detection of interrogation and transponder reply signals at a plurality of predetermined locations, and avoids imprecision by negating the effect of the transponder reply time.

SUMMARY OF THE INVENTION

The present invention provides means for repetitively determining on a real-time basis the position of a landing aircraft through the use of at least four receivers. This number of receivers enables the elimination of errors associated with transponder reply time in determining the position of the aircraft relative to the runway.

In accordance with the present invention, at least four receivers are located at different predetermined positions around an airport. Each receiver is tuned to detect transponder signals and includes a precision timer synchronous with the other timers. In response to detecting a transponder signal, each receiver records its detection time.

The precision landing system of the present invention further includes a central processing unit (CPU) 19 at a base station which collects the time measurements from the receivers, and performs calculations to determine the location of the aircraft. Typically, the base station CPU is located at the control tower 14 for easy monitoring by an air traffic controller, but may be located elsewhere. Since at least four independent measurements are used, the base station CPU can compute not only the three-dimensional coordinates of the aircraft, but also the transponder reply time.

The coordinates of the aircraft are then compared with a mathematical description of a desired approach path. Any approach path that can be mathematically represented may be used, including paths having curves, steps, and segments. As an added advantage, various predetermined approach paths may be used for the same runway, allowing the approach path to be selected to correspond to the particular landing aircraft's preferred landing characteristics.

In a preferred embodiment, the base station CPU uses estimation filtering calculations, such as Kalman filtering, to improve the accuracy of the position determination and to provide fault detection and tolerance.

It is therefore a principal objective of the present invention to provide a system for calculating to a high degree of precision the position of a landing aircraft. This position can then compared with a predetermined approach path, the error determined, and this information transmitted to the aircraft.

It is another objective to eliminate, in an aircraft landing system of the type described, the effects of transponder delay time.

The foregoing and other objectives, features and advantages of the present invention will be more readily understood upon consideration of the following detailed description of the invention taken in conjunction with the accompanying drawings.

DETAILED DESCRIPTION OF THE INVENTION

Figure 1:
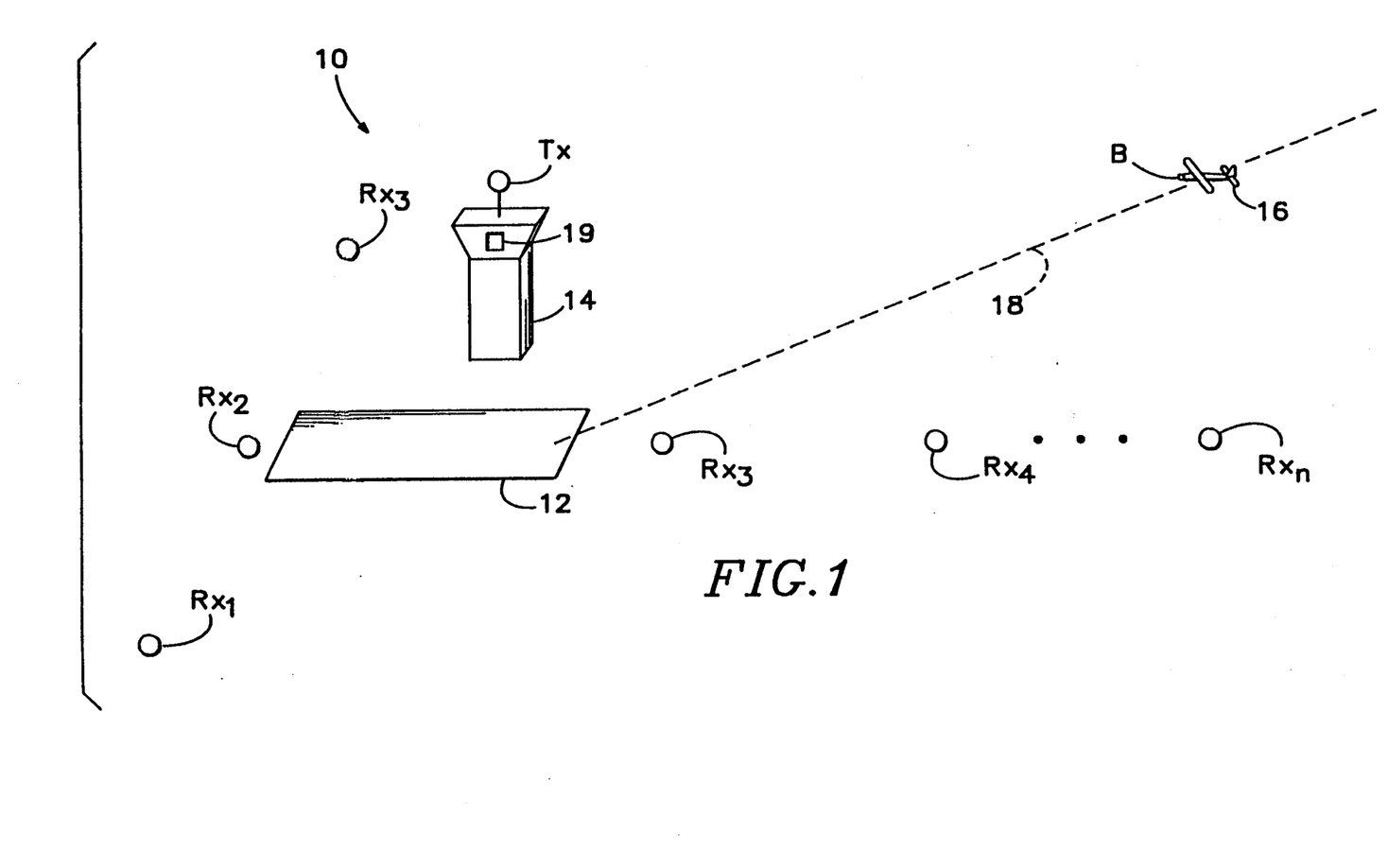
FIG. 1 is a perspective view showing the elements of a precision landing system in accordance with the present invention located nearby an airport.

Refer now to FIG. 1, where an airport 10 having a runway 12 and a control tower 14 is shown. A precision aircraft landing system according to the present invention operates to guide an aircraft 16 along a predefined approach path 18, which leads to the runway. The precision landing system comprises a plurality of receivers Rx, at least four in number, located at known predetermined positions in and around the airport. The receivers, which may be at ground (and not necessarily the same) level, are shown in a "T" configuration extending beneath the approach path 18. In an exemplary embodiment, receivers $Rx_1$ and $Rx_3$ are separated by four kilometers and receiver $Rx_n$ is two kilometers from the end of the runway. Generally, accuracy of the landing system improves with an increase in these distances up to some undetermined limit. This T-shaped receiver arrangement, although convenient, is not necessary for proper operation of the landing system. What is required is that the receivers be positioned at different, non-collinear locations.

The landing system requires a transponder B onboard the aircraft and a ground-based interrogator Tx located at a known predetermined position. These may be independent of other instruments at the airport and on the aircraft, or may be of the type used in the Air Traffic Control Radar Beacon System (ATCRBS) or Discrete Address Beacon System (DABS). In operation, the interrogator and transponder cooperate in that the interrogator transmits an interrogation signal which is detected by the transponder, and, in response, the transponder transmits a reply signal.

The receivers $Rx_i$ are tuned to detect the interrogation and transponder reply signals. A precision timer within each transponder measures the time interval between the detection of these respective signals.

Figure 2:
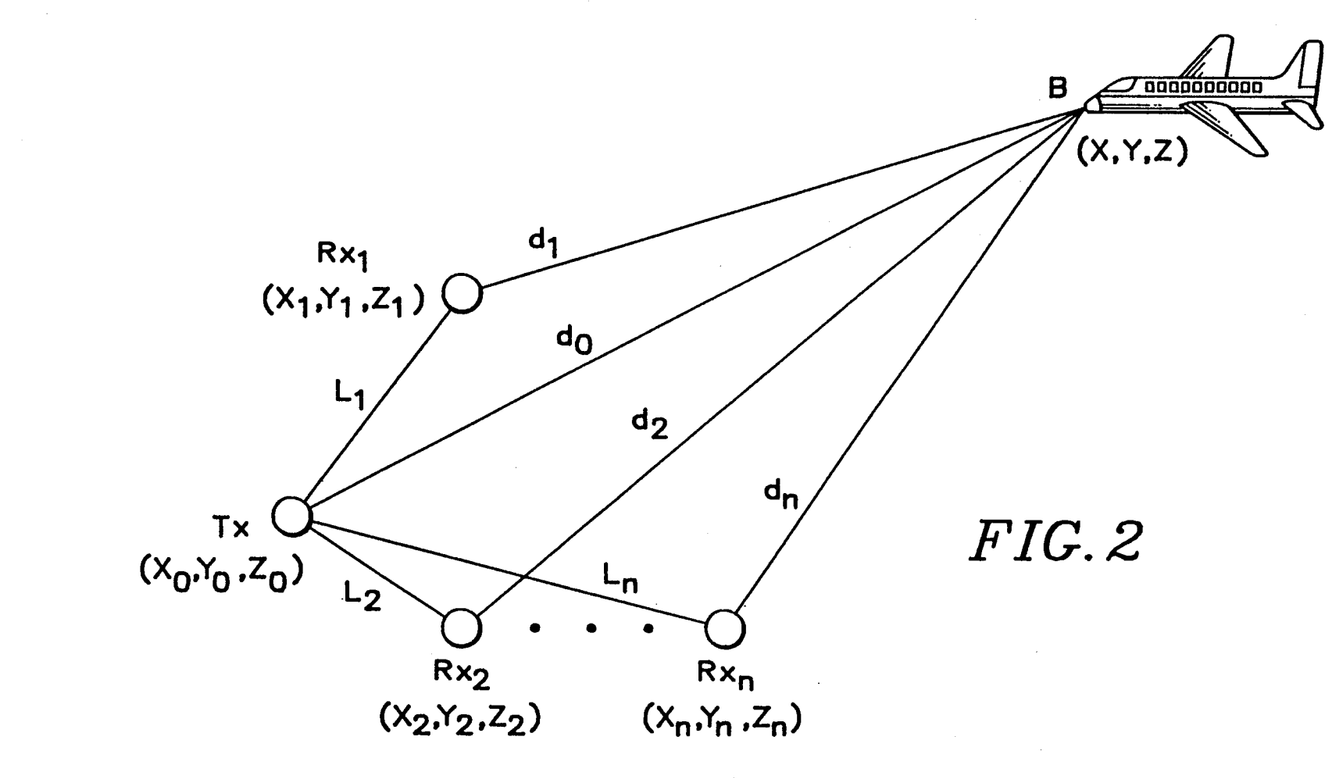
FIG. 2 is a simplified schematic diagram showing locations and distances of elements of the precision landing system of the present invention in an exemplary embodiment.

Referring now to FIG. 2, the interrogator Tx, the receivers $Rx_i$, and the transponder B are shown in a general schematic form, displaying locations and distances used in the discussion below. The interrogator Tx is located at position $(x_0, y_0, z_0)$. The receivers $Rx_i$ are located at respective positions $(x_i, y_i, z_i)$, with the number of receivers being n. The transponder B onboard the aircraft has a position $(x, y, z)$. The distances from the respective receivers $Rx_i$ to the transmitter Tx are designated by $L_i$, the distances from the respective receivers $Rx_i$ to the transponder B are designated by $d_i$, and the distance from the interrogator Tx to the transponder B is designated by $d_0$.

During operation of the precision landing system, the interrogator Tx transmits an interrogation signal which is composed of pulses modulated onto a carrier frequency. The interrogation signal is received by both the n receivers $Rx_i$ and the transponder B. The transponder B, in response to receiving the interrogation signal, transmits a reply signal which is also composed of pulses modulated onto a carrier frequency. The time interval between the transponder's receipt of the interrogation signal and its subsequent transmission of the reply signal is referred to herein as the transponder reply time $\tau$.

In an exemplary embodiment, the receivers each demodulate the interrogation signal and detect the leading edge of its first pulse. Each receiver also demodulates the reply signal and detects the leading edge of its first pulse. Timers, included in each receiver, measure, using the leading edges of the respective signals as markers, the time interval between which each respective receiver detects the interrogation and reply signals. The resulting time interval measured by each respective receiver $Rx_i$ is $t_i$. These respectively determined time intervals $t_1-t_n$ are relayed to a base station CPU 19.

It will be apparent to one skilled in the art that the function of detecting the interrogation signal is to synchronize the receivers' timers. Adding $L_i/c$, which is the time required for the interrogation signal to reach the respective receivers $Rx_i$ where c is the speed radio wave propagation, to the respective time measurements $t_i$ effectively starts each timer at the same moment, that is, the moment the interrogator Tx transmits the interrogation signal. Other methods of sending synchronizing signals to the timers, such as a transmitter operating on a frequency different from the transponder or the interrogator, or an optical fiber link, would achieve the same net result.

Indeed, with an alternative method of synchronization, interrogation is unnecessary for proper operation of a landing system according to the present invention; the system could track an aircraft having onboard a beacon transmitting signals at frequent intervals.

If the timers were perfect, drift-free clocks, then a single synchronization at system initialization would be sufficient. However, since economically feasible timers will have drift, synchronizing on the interrogation pulse has the advantage of occurring immediately before the receipt of a transponder reply signal, thereby minimizing the interval over which the timers must remain synchronous.

In alternative embodiments of the system, the receivers could use different methods to detect the signals and measure the time intervals. In one such system, the trailing edges of the pulses would be detected, either instead or in addition to the leading edges. In another system, a "matched-filter" receiver (well-known in the radar art) can be used to improve the accuracy of the time-of-arrival measurement. Yet another system could use phase-coherent methods, such as described in Nehama U.S. Pat. No. 3,564,543 to measure the interval between interrogation and reply.

In another alternative embodiment of the system, the receivers could time multiple periods within each interrogation-reply cycle. Each interval would begin as described above, and the different intervals would end at the detection of the different respective pulses in the reply signal. The effect of using reply pulses subsequent to the first is then the same as an increase in the transponder reply time. These times could be averaged, or treated as separate sets of measurements.

From these sets of time intervals, the base station CPU calculates the location of the transponder B, and thus, the aircraft. (The methods of calculation will be discussed below.) The calculated position is then compared with a desired approach path. Because of the generality of the comparison made, any approach path for the aircraft that can be described mathematically can be used. Consequently, there is no limitation on the application of the disclosed system to only a single approach path per runway.

As a result of comparing the aircraft's position with the desired approach path, any error in the aircraft's position relative thereto can be determined. This error may then be communicated to the aircraft by a variety of methods. In the simplest method, the error would be displayed to an air traffic controller, who would then orally relay the information to the pilot.

A second method of communicating the error to the pilot could involve the use of the ILS instruments typically installed in an aircraft. In normal operation, an ILS instrument detect two pairs of signals, as described earlier in the Background of the Invention. In the ILS instrumentation, the relative strengths of these two signals indicates the aircraft's offset from the defined landing approach path. The base station could control a transmitter which would transmit these two pairs of signals in variable signal strengths such that the aircraft's ILS instruments would display the proper correction.

A third method of communication could entail the use of specialized instruments onboard the aircraft for receiving information from the base station. Such a specialized instrument could display not only the horizontal and vertical deviations from the approach path in analog or digital representations, but could also display other calculated information such as distance from the runway, elevation, and vertical and horizontal velocities.

Finally, the base station could relay commands to an automatic pilot onboard the aircraft, which would then automatically guide the aircraft to a landing.

CALCULATIONS BASED ON FOUR RECEIVERS

The time required for the transmitter signal to reach the aircraft, plus the transponder delay time, and the time for the transponder reply signal to return to a receiver $Rx_i$, is equal to the time required for the transmitter signal to reach the receiver $Rx_i$ plus the time interval $t_1$ measured by the receiver. Thus, in equation form, using the variables shown in FIG. 2

$$\frac{d_0}{c} + \tau + \frac{d_i}{c} = \frac{L_i}{c} + t_i \quad (1)$$

As the distances $L_1$ from the interrogator Tx to the respective receivers $Rx_1$ are known, by setting a new variable $t'_1$ equal to $t_1 + L_1/c$, equation (1) can be rewritten as $$t'_i = \frac{d_0 + d_i}{c} + \tau \quad (2)$$

Expanding equation (2) using the coordinate positions of Tx, $Rx_i$, and B shown in FIG. 2, yields $$t'_i = \frac{1}{c}\sqrt{(x-x_0)^2 + (y-y_0)^2 + (z-z_0)^2} + \frac{1}{c}\sqrt{(x-x_i)^2 + (y-y_i)^2 + (z-z_i)^2} + \tau \quad (3)$$

There are four unknown quantities in $t_i$, that is, x, y, z, and $\tau$, so a minimum of four receivers at different known locations are required to solve for the unknowns. Consider the set of four measurements $t_i$ for i=1, 2, 3, 4. This constitutes a set of four nonlinear equations with four unknowns which may be solved using numerical analysis techniques appropriate for solving simultaneous nonlinear equations. As a result, the aircraft's position (x, y, z) as well as the transponder delay time $\tau$ can be determined.

Since the transponder delay time $\tau$ is not of interest, the equations may be simplified by taking differences, eliminating $\tau$. This defines three new quantities $\lambda_1$ and a system of three equations which are functions of the three unknowns x, y and z. The variable $\lambda_1$ is the difference in range to the aircraft between $Rx_{i+1}$ and $Rx_1$.

$$\lambda_1 = c(t'_2 - t'_1) = d_2 - d_1 \quad (4a)$$

$$\lambda_2 = c(t'_3 - t'_1) = d_3 - d_1 \quad (4b)$$

$$\lambda_3 = c(t'_4 - t'_1) = d_4 - d_1 \quad (4c)$$

Note that each of equations (4a), (4b), and (4c) defines a hyperboloid; more precisely, one sheet of a hyperboloid of two sheets. The solution for the aircraft position is defined by the intersection of the three hyperboloids. In general, three convex surfaces intersect at two points if they intersect at all, so that there will be two solutions. The extraneous solution must be rejected in practice, either on physical grounds (for instance, one solution might be underground) or by other means.

Calculations Based on More Than Four Receivers

More than four receivers may be used; the problem is then over-determined and may be solved in a least-squares sense. The additional receivers can also alleviate the problem of the extraneous solution as long as the receivers are not coplanar. Any number of coplanar receivers will always produce two solutions because the plane defined by the receivers is a plane of symmetry. A solution will remain a solution when reflected through that plane. However, the undesired solution in the coplanar case is easily rejected as it is underground. It is believed that a non-coplanar receiver will eliminate the false solution.

As an advantage, the use of more than four receivers provides fault tolerance to the system by providing redundant receivers. As long as the remaining operational receivers are not collinear, the base station CPU can continue to calculate the landing aircraft's position.

Filtering Calculations

A preferred embodiment of a precision landing system according to the present invention uses Kalman filtering to improve the accuracy of the determination of the aircraft's position. The filtering improves the accuracy by using not only the most recent receiver measurements, but also the previously determined aircraft position, the statistical "reliability" of that position, and the statistical variance of the current measurements.

Kalman filtering, in combination with more than four receivers, provides additional error detection and fault tolerance. The Kalman filtering can function properly with missing data such as could be caused by a damaged receiver, and can detect spurious data from an otherwise operational receiver. In either case, Kalman filtering allows the unreliable data to be discarded, ensuring a statistically optimal determination of the aircraft's position based on the data from the remaining operational receivers. Additionally, Kalman filtering provides a real-time error estimation which is useful in determining whether to rely on the position determination, or to order a "missed approach".

Quantities used in the Kalman filter calculations are shown below in Table 1 where m is the dimension of the state vector and n is the dimension of the measurement vector.

TABLE 1

| MATRIX | DIM. | DESCRIPTION |
|---|---|---|
| x | m × 1 | State vector |
| P | m × m | State error covariance matrix |
| Φ | m × m | State transition matrix |
| Q | m × m | Process noise covariance matrix |
| z | n × 1 | Measurement vector |
| R | n × n | Measurement error covariance matrix |
| h | n × 1 | Measurement function |
| H | n × m | Measurement matrix |
| ν | n × 1 | Innovation or measurement residual |
| S | n × n | Innovation covariance matrix |
| K | m × n | Gain matrix |

These matrices are used to calculate the aircraft's position using the equations listed below $$x(k + 1|k) = \Phi(k + 1, k) \times (k|k) \tag{5}$$

$$P(k + 1|k) = \Phi(k + 1, k)P(k|k)\Phi^T(k + 1, k) + Q(k) \tag{6}$$

$$H(k + 1) = \left.\frac{\partial h(k + 1, x)}{\partial x}\right|_{x = x(k+1|k)} \tag{7}$$

$$v(k + 1) = z(k + 1) - h[k + 1, x(k + 1|k)] \tag{8}$$

$$S(k + 1) = H(k + 1)P(k + 1|k)H^T(k + 1) + R(k + 1) \tag{9}$$

$$K(k + 1) = P(k + 1|k)H^T(k + 1)S^{-1}(k + 1) \tag{10}$$

$$x(k + 1|k + 1) = x(k + 1|k) + K(k + 1)v(k + 1) \tag{11}$$

$$P(k + 1|k + 1) = [I - K(k + 1)H(k + 1)]P(k + 1|k) \tag{12}$$

In the above equations, the argument notation (k|j) means "estimated value at time $t_k$ given data through time $t_j$". With x and z, the argument notation (k) means the true value at time $t_k$, whereas (k|j) refers to an estimated value. Equations (5) and (6) are referred to as the "time update" equations; equations (11) and (12) are referred to as the "measurement update" equations.

The state transition matrix Φ, the measurement function h, and the measurement matrix H are usually coded into the Kalman filter, and the initial values of the state vector x(0|0) and the state error covariance matrix P(0|0) are either computed from the initial sensor contact or estimated from heuristics. The process noise covariance matrix Q is usually a heuristic set to accommodate expected target maneuvers, but it may be set adaptively by more advanced formulations of the Kalman filter. The matrix R is determined by the noise characteristics of the sensor.

The principal variation on this set of equations is the so called "UD" or Bierman form of the filter, which uses a different method of forming the gain and performing the updates of the state error covariance matrix P.

State Vector x The state vector x of the aircraft includes the aircraft's position, the aircraft's velocity components, and the transponder reply time τ. The state vector x in matrix form is $$x = \begin{bmatrix} x \\ y \\ z \\ v_x \\ v_y \\ v_z \\ \tau \end{bmatrix} \tag{13}$$

State Transition Matrix Φ The state transition matrix is used in equations (5) and (6) to predict the next state of the aircraft. Since the landing aircraft is assumed to be flying in a non-accelerating state, the new coordinates are merely the old coordinates plus the old velocity times the time increment Δt. The velocity elements and the transponder reply time τ do not change.

$$x(k+1|k) = x(k|k) + v_x(k|k)\Delta t \tag{14a}$$

$$y(k+1|K) = y(k|k) + v_y(k|k)\Delta t \tag{4b}$$

$$z(k+1|k) = z(k|k) + v_z(k|k)\Delta t \tag{4c}$$

$$v_y(k+1|k) = v_y(k|k) \tag{14e}$$

$$v_z(k+1|k) = v_z(k|k) \tag{14f}$$

$$\tau(k+1|k) = \tau(k|k) \tag{14g}$$

Represented in matrix form, the state transition matrix is $$\Phi = \begin{bmatrix} 100\Delta t & 0 & 0 & 0 \\ 010 & 0 & \Delta t & 0 & 0 \\ 001 & 0 & 0 & \Delta t & 0 \\ 000 & 1 & 0 & 0 & 0 \\ 000 & 0 & 1 & 0 & 0 \\ 000 & 0 & 0 & 1 & 0 \\ 000 & 0 & 0 & 0 & 1 \end{bmatrix} \tag{15}$$

Process Noise Covariance Matrix Q The state transition matrix shown in equation (15) does not produce any accelerations, nor does it allow the transporter delay time τ to drift. The process noise covariance matrix Q is an "aging" matrix that allows for those events to occur. Usually one chooses an estimated Q and then "finetunes" it through computer simulation or flight test. A first guess for Q is usually computed by considering the maximum acceleration that the aircraft is likely to perform. If that acceleration is a and Δt is the time interval between measurements, then the elements of Q may be represented by $$Q_{11} = Q_{22} = Q_{33} = [\tfrac{1}{2} a (\Delta t)^2]^2 \tag{16a}$$

$$Q_{44} = Q_{55} = Q_{66} = (a\Delta t)^2 \tag{16b}$$

$$Q_{ij} = 0 \text{ for } i \neq j \tag{16c}$$

The remaining element $Q_{\tau\tau}$ not defined in equations (16a) through (16b) characterizes the short-term variations in $\tau$, as well as allowing long-term drift via an accumulation of small short-term changes. It must be determined by experiment or by relying on transponder specifications.

Measurement Function h Each receiver measures a time interval $(d_O + d_i - L_i)/c + \tau$. The quantities $L_i$ are known for each installation by surveying, so the interval can be corrected as shown in equation (2) to produce the measurement function h. With n receivers (i=1, 2, ..., n), the measurement function matrix h is represented as $$h = \begin{bmatrix} \dfrac{d_0 + d_1}{c} + \tau \\ \dfrac{d_0 + d_2}{c} + \tau \\ \vdots \\ \dfrac{d_0 + d_n}{c} + \tau \end{bmatrix} \tag{17}$$

Measurement Matrix H The measurement matrix H is $$H_{ij} = \frac{\partial h_i}{\partial x_j} \tag{18}$$

where $x_j$ is the jth element of the aircraft state x, not the x-position of receiver j. Thus $$H_{11} = \frac{\partial}{\partial x}\left[\frac{d_0 + d_1}{c} + \tau\right] = \frac{1}{c}\left[\frac{x - x_0}{d_0} + \frac{x - x_1}{d_1}\right] \tag{19}$$

$$H_{12} = \frac{\partial}{\partial y}\left[\frac{d_0 + d_1}{c} + \tau\right] = \frac{1}{c}\left[\frac{y - y_0}{d_0} + \frac{y - y_1}{d_1}\right] \tag{20}$$

$$H_{13} = \frac{\partial}{\partial z}\left[\frac{d_0 + d_1}{c} + \tau\right] = \frac{1}{c}\left[\frac{z - z_0}{d_0} + \frac{z - z_1}{d_1}\right] \tag{21}$$

$$H_{14} = \frac{\partial}{\partial v_x}\left[\frac{d_0 + d_1}{c} + \tau\right] = 0 \tag{22}$$

$$H_{15} = \frac{\partial}{\partial v_y}\left[\frac{d_0 + d_1}{c} + \tau\right] = 0 \tag{23}$$

$$H_{16} = \frac{\partial}{\partial v_z}\left[\frac{d_0 + d_1}{c} + \tau\right] = 0 \tag{24}$$

$$H_{17} = \frac{\partial}{\partial \tau}\left[\frac{d_0 + d_1}{c} + \tau\right] = 1 \tag{25}$$

$$H_{m1} = \frac{\partial}{\partial x}\left[\frac{d_0 + d_m}{c} + \tau\right] = \frac{1}{c}\left[\frac{x - x_0}{d_0} + \frac{x - x_m}{d_m}\right] \tag{26}$$

$$H_{m7} = \frac{\partial}{\partial \tau}\left[\frac{d_0 + d_1}{c} + \tau\right] = 1 \tag{27}$$

Measurement Error Covariance Matrix R Because there is no expected correlation between receivers, the measurement error covariance matrix R is diagonal with $R_{ii} = \sigma_i^2$, that is, the timing variance of receiver $Rx_i$. The variance $\sigma_i^2$ is a function of the signal to noise ratio at receiver i and of any additional errors in the timing system. These can all be characterized such that $\tau_i^2$ is computed depending on the measured signal strength at receiver i. The variance $\sigma_i^2$ as a function of signal level can be measured experimentally for each receiver in a preferred embodiment. This calibration can be checked periodically as needed. The variance $\sigma_i^2$ is also function of the rise time of the transponder's transmitted pulse. This rise time can be measured so the proper accuracy can be used in each case, even if different aircraft's transponders give different rise times.

The measurement function h, the measurement matrix H, and the measurement error covariance matrix R have been specified as would be used in a concurrent-processing Kalman filter. However, it would also be straightforward for those skilled in the art to convert them for use in a sequential-processing type filter.

Filter Initialization The filter is initialized using the initial contact with the aircraft. Using time interval measurements from four receivers such as $R_1$, $R_2$, $P_3$, and $R_n$, the position of the aircraft and the transponder reply time both may be calculated as described above in connection with four receiver calculations. The velocity elements of the state vector are initialized to zero. If the approaching aircraft's course and speed are known, they can be used to initialize the velocity elements of the state vector x.

The four-by-four submatrix of $P(O|O)$ corresponding to the x, y, z, and $\tau$ elements is computed from R by standard error propagation $$[P(O|O)_{submatrix} = H^{1}R(H^{-1})^{\tau} \tag{28}$$

where H is the four-by-four H matrix corresponding to the four measurements used to initialize the state.

The elements of the state error covariance matrix P are initialized by setting the diagonals to large values $$P_{44} = P_{55} 32\, v_{max,h}^2 \tag{29a}$$

$$P_{66} = v_{max,v}^2 \tag{29b}$$

where the $v_{max}$ parameters represent the maximum likely aircraft velocities, which are chosen by computer simulation study. The vertical component $v_{max,v}$ will be smaller than the horizontal component $v_{max,h}$.

If a known course and speed were used to initialize velocity, then $P_{44}$, $P_{55}$, and $P_{66}$ would be chosen to reflect the variances of those numbers, which would depend on the accuracy of the instruments measuring these quantities, for example, the accuracy of the aircraft's instruments.

The resulting state error covariance matrix P is $$P = \begin{bmatrix} P_{11} & P_{12} & P_{13} & 0 & 0 & 0 & P_{17} \\ P_{21} & P_{22} & P_{23} & 0 & 0 & 0 & P_{27} \\ P_{31} & P_{32} & P_{33} & 0 & 0 & 0 & P_{37} \\ 0 & 0 & 0 & P_{44} & 0 & 0 & 0 \\ 0 & 0 & 0 & 0 & P_{55} & 0 & 0 \\ 0 & 0 & 0 & 0 & 0 & P_{66} & 0 \\ P_{71} & P_{72} & P_{73} & 0 & 0 & 0 & P_{77} \end{bmatrix} \quad (30)$$

The state vector x and the state error covariance can be initialized using two initial measurements. The velocity elements would then be initialized to the differences between the position elements, divided by $\Delta t$. $P(O|O)$ can be derived by similar error propagation techniques.

When multiple observations are processed by a Kalman filter, the estimate of the transponder delay time $\tau$ will approach a constant. If $\tau$ is well-known, then the range from each receiver to the aircraft is observed, rather than just the differences in range between the receivers. In this case, three receivers are sufficient to locate the aircraft to within a reflection about the plane of the receivers, and the presence of a fourth non-coplanar receiver will remove the ambiguity. For this reason, as long as the Kalman filter is initialized close to the correct solution, there will be little danger of tracking a false solution.

The terms and expressions which have been employed in the foregoing specification are used therein as terms of description and not of limitation, and there is no intention, in the use of such terms and expressions, of excluding equivalents of the features shown and described or portions thereof, it being recognized the scope of the invention is defined and limited only by the claims which follow.

What is claimed is:

1. A precision landing system for guiding an aircraft along a predetermined approach path within operable range of a ground-based interrogator which transmits an interrogation signal, said aircraft having onboard a transponder which transmits a transponder reply signal in response to receiving said interrogation signal, said system comprising:
    (a) at least four ground-based receiver, each of said receivers being positioned at a predetermined position and comprising
        (i) means for receiving said interrogation signal,
        (ii) means for receiving said transponder reply signal, and
        (iii) means for determining an elapsed time between receiving said interrogation signal and receiving said transponder reply signal;
    (b) a computer comprising
        (i) means for receiving said respective elapsed times from said respective receivers,
        (ii) means for calculating from said respective elapsed times a position of said aircraft,
        (iii) for comparing said position with said predetermined approach path, resulting in the determination of a position error; and
    (c) means for communicating said position error to said aircraft.

2. The precision landing system of claim 1 wherein all of said receivers are contained within a single, substantially horizontal, geometric plane.

3. The precision landing system of claim 1 wherein said means for calculating includes an estimation filter.

4. The precision landing system of claim 3 wherein said estimation filter is a Kalman filter.

5. A precision landing system for guiding an aircraft along a predetermined approach path, said aircraft having onboard a transponder which transmits a transponder reply signal in response to receiving an interrogation signal from a ground-based transmitter, said system comprising:
    (a) ground-based interrogation means for transmitting an interrogation signal;
    (b) at least four ground-based receivers, each of said receivers being positioned at a predetermined position and comprising
        (i) means for receiving said interrogation signal,
        (ii) means for receiving said transponder reply signal, and
        (iii) means for determining an elapsed time between receiving said interrogation signal and receiving said transponder reply signal;
    (c) a computer comprising
        (i) means for receiving said respective elapsed times from said respective receivers,
        (ii) means for calculating from said respective elapsed times a position of said aircraft,
        (iii) means for comparing said position with said predetermined approach path, resulting in the determination of a position error; and
    (d) means for communicating said position error to said aircraft.

6. A precision landing system for guiding an aircraft along a predetermined approach path, comprising:
    (a) ground-based interrogation means for transmitting an interrogation signal;
    (b) transponder means onboard said aircraft for receiving said interrogation signal, and, in response, transmitting a transponder reply signal;
    (c) at least four ground-based receivers, each of said receivers being positioned at a predetermined position and comprising
        (i) means for receiving said interrogation signal,
        (ii) means for receiving said transponder reply signal, and
        (iii) means for determining an elapsed time between receiving said interrogation signal and receiving said transponder reply signal;
    (d) a computer comprising
        (i) means for receiving said respective elapsed times from said respective receivers,
        (ii) means for calculating from said respective elapsed times a position of said aircraft,
        (iii) means for comparing said position with said predetermined approach path, resulting in the determination of a position error; and
    (e) means for communicating said position error to said aircraft.

7. A precision landing system for guiding an aircraft along a predetermined approach path, said aircraft having onboard a transponder which transmits an transponder reply signal, said system comprising:
    (a) at least four ground-based receivers, each of said receivers being positioned at a predetermined position and comprising
        (i) means for receiving said transponder reply signal, and
        (ii) timer means for determining an arrival time corresponding to the receiving of said transponder reply signal;

(b) means for synchronizing said timer means of each of said receivers;

(c) a ground-based computer comprising
   (i) means for receiving signals representing said respective arrival times from said respective receivers,
   (ii) means for calculating, from said signals representing said respective arrival times, a position of said aircraft, and
   (iii) means for comparing said calculated position with said predetermined approach path, resulting in the determination of a position error; and (d) means for communicating said position error to said aircraft.

8. The precision landing system of claim 7 wherein said means for synchronizing said timer means includes means within each said receiver for receiving a synchronization signal.

9. The precision landing system of claim 8 wherein said means for synchronizing said timer means includes means for receiving an interrogation signal transmitted by an interrogator.

10. The precision landing system of claim 7 wherein all of said receivers are contained within a single, substantially horizontal, geometric plane.

11. The precision landing system of claim 7 wherein said means for calculating includes an estimation filter.

12. The precision landing system of claim 7 wherein said estimation filter is a Kalman filter.

13. The precision landing system of claim 7 wherein said means for communicating said position error transits a signal received by an ILS instrument on board said aircraft.

14. A precision landing system for guiding an aircraft along a predetermined approach path within operable range of a ground-based interrogator which transmits an interrogation signal, said aircraft having onboard a transponder which transmits a transponder reply signal in response to receiving said interrogation signal, said system comprising:

(a) at least three ground-based receivers, each of said receivers being positioned at a predetermined position and comprising
   (i) means for receiving said transponder reply signal, and
   (ii) timer means for determining an arrival time corresponding to said receiving of said transponder reply signal;

(b) means for synchronizing said timer means of each of said receivers;

(c) a computer comprising
   (i) means for receiving signals representing said respective arrival times from said respective receivers,
   (ii) means for calculating from said signals representing said respective arrival times a position of said aircraft, said means for calculating including an estimation filter, and
   (iii) means for comparing said calculated position with said predetermined approach path, resulting in the determination of a position error; and (d) means for communicating said position error to said aircraft.

15. The precision landing system of claim 14 wherein said means for synchronizing said timer means includes means within each receiver for receiving a synchronization signal.

16. The precision landing system of claim 15 wherein said means for synchronizing said timer means includes means for receiving said interrogation signal.

* * * * *

UNITED STATES PATENT AND TRADEMARK OFFICE
CERTIFICATE OF CORRECTION

PATENT NO. : 5,017,930
DATED : May 21, 1991
INVENTOR(S) : John R. Stoltz, et al.

It is certified that error appears in the above-identified patent and that said Letters Patent is hereby corrected as shown below:

Abstract, line 4, change "timer" to --time--.

Abstract, line 18, change "than" to --that--.

Col. 2, line 68, insert --be-- before "compared".

Col. 3, line 29, change "Rx" to --$Rx_i$--.

Col. 5, line 24, change "detect" to --detects--.

Col. 5, line 61, change "$L_1$" to --$L_i$--.

Col. 5, line 63, change "$L_1$" to --$L_i$--.

Col. 5, line 62, change "$Rx_1$" to --$Rx_i$--.

Col. 5, line 63, change "$t'_1$" to --$t'_i$--.

Col. 5, line 63, change "$t_1$" to --$t_i$--.

Col. 6, line 24, change "$\lambda_1$" to --$\lambda_i$--.

Col. 7, line 31, insert comma after "innovation".

Col. 8, line 8, underline "State Vector x".

UNITED STATES PATENT AND TRADEMARK OFFICE
CERTIFICATE OF CORRECTION

PATENT NO. : 5,017,930

DATED : May 21, 1991

INVENTOR(S) : John R. Stoltz, et al.

It is certified that error appears in the above-identified patent and that said Letters Patent is hereby corrected as shown below:

Col. 8, line 22, underline "State Transition Matrix $\phi$"

Col. 8, line 33, in the equation, change the left side thereof to --y(k+1/k)-- and change "(4b)" to --(14b)--.

Col. 8, line 36, change "(4c)" to --(14c)--.

Col. 8, after line 36 insert --$V_x(k+1|k)=V_x(k|k)$ (14d)--.

Col. 8, line 57, underline "Process Noise Covariance Matrix Q".

Col. 8, line 59, change "transporter" to --transponder--.

Col. 9, line 8, change "$Q_{TT}$" to --$Q_{77}$--.

Col. 9, line 14, underline "Measurement Function h".

Col. 9, line 33, underline "Measurement Matrix H".

Col. 10, line 10, underline "Measurement Error Covariance Matrix R".

Col. 10, line 17, change "$\tau_i^2$" to --$\sigma_i^2$--.

Col. 10, line 22, insert --a-- after "also".

UNITED STATES PATENT AND TRADEMARK OFFICE
CERTIFICATE OF CORRECTION

PATENT NO. : 5,017,930

DATED : May 21, 1991

INVENTOR(S) : John R. Stoltz, et al.

It is certified that error appears in the above-identified patent and that said Letters Patent is hereby corrected as shown below:

Col. 10, line 33, underline "Filter Initialization".

Col. 10, line 35, change "$P_3$" to --$R_3$--.

Col. 10, line 47, insert close bracket (]) after "(0|0)"; same line, change "$H^1$" to --$H^{-1}$--.

Col. 10, line 54, change "$32V_{max,h}^2$" to --$=V_{max,h}^2$--.

Col. 10, line 56, change "$V_{max,v}^2$" to $V_{max,v}^2$--.

Col. 11, line 44, change "receiver" to --receivers--.

Col. 11, line 59, insert --means-- before "for comparing".

Col. 12, line 59, change "an" to --a--.

Col. 13, line 31-32, change "transits" to --transmits--.

Signed and Sealed this

Nineteenth Day of January, 1993

Attest:

DOUGLAS B. COMER

Attesting Officer   Acting Commissioner of Patents and Trademarks